US012533608B2

(12) United States Patent
Peng et al.

(10) Patent No.: US 12,533,608 B2
(45) Date of Patent: Jan. 27, 2026

(54) DE-AERATING FROTH PRODUCTS

(71) Applicant: THE UNIVERSITY OF QUEENSLAND, St. Lucia (AU)

(72) Inventors: Yongjun Peng, Middle Park (AU); Xumeng Chen, Chapel Hill (AU)

(73) Assignee: THE UNIVERSITY OF QUEENSLAND, St Lucia (AU)

( * ) Notice: Subject to any disclaimer, the term of this patent is extended or adjusted under 35 U.S.C. 154(b) by 581 days.

(21) Appl. No.: 17/795,824

(22) PCT Filed: Jan. 27, 2021

(86) PCT No.: PCT/AU2021/050045
§ 371 (c)(1),
(2) Date: Jul. 27, 2022

(87) PCT Pub. No.: WO2021/151145
PCT Pub. Date: Aug. 5, 2021

(65) Prior Publication Data
US 2023/0091569 A1    Mar. 23, 2023

(30) Foreign Application Priority Data
Jan. 28, 2020   (AU) ................ 2020900214

(51) Int. Cl.
*B01D 19/00*   (2006.01)
*B01D 19/02*   (2006.01)
*B03D 1/08*    (2006.01)
(52) U.S. Cl.
CPC ......... *B01D 19/0052* (2013.01); *B01D 19/02* (2013.01); *B03D 1/082* (2013.01)

(58) Field of Classification Search
CPC ................ B01D 19/0052; B01D 19/02; B01D 19/0057; B01D 21/2494; B01D 53/24;
(Continued)

(56) References Cited
U.S. PATENT DOCUMENTS
2004/0011201 A1*  1/2004  Stevens .............. B01D 21/2494
                                                            96/204

FOREIGN PATENT DOCUMENTS
CN     101918099 A    12/2010
CN     202942686      5/2013
(Continued)

OTHER PUBLICATIONS
International Preliminary Report on Patentability and Written Opinion of the International Searching Authority dated Jul. 28, 2022, issued in International Application No. PCT/AU2021/050045, 8 pages.
(Continued)

Primary Examiner — Jennifer Dieterle
Assistant Examiner — Qianping He
(74) Attorney, Agent, or Firm — Nixon & Vanderhye P.C.

(57) ABSTRACT
An apparatus (40) for deaerating a froth comprising a spinning basket (44) mounted on a driven shaft (46). The side walls of the spinning basket have a mesh or openings therein. Froth is supplied to the interior of the spinning basket and contacts the floor of the spinning basket and is flung outwardly through the mesh or openings to break the bubbles and deaerate the froth. A solid wall (42) may surround the spinning basket to further assist in deaeration. A spinning plate may be used in place of the spinning basket. In another embodiment, vacuum is used to deaerate the froth.

18 Claims, 9 Drawing Sheets

(58) Field of Classification Search
CPC .. B03D 1/082; B03D 1/10; B29B 7/84; B29B 7/847; B29C 48/76
USPC .......... 95/242, 261, 262, 266, 196; 210/188; 96/220, 217
See application file for complete search history.

(56) References Cited

FOREIGN PATENT DOCUMENTS

| | | | | |
|---|---|---|---|---|
| CN | 106693451 | | 5/2017 | |
| CN | 106693451 A | * | 5/2017 | ............. B01D 19/02 |
| CN | 107875680 A | | 4/2018 | |
| GB | 703348 A | | 2/1954 | |
| JP | 2012-217895 | | 11/2012 | |

OTHER PUBLICATIONS

Office Action dated Jan. 2, 2024, issued in China Application No. 202180016417.5, 8 pages.
International Search Report dated Apr. 12, 2021, for PCT/AU2021/050045, 6 pp.
Written Opinion of the ISA dated Apr. 12, 2021, for PCT/AU2021/050045, 7 pp.

* cited by examiner

DE-AERATING FROTH PRODUCTS

This application is the U.S. national phase of International Application No. PCT/AU2021/050045 filed Jan. 27, 2021, which designated the U.S. and claims priority to AU 2020900214 filed Jan. 28, 2020, the entire contents of each of which are hereby incorporated by reference.

TECHNICAL FIELD

The present invention relates to an apparatus and a method for deaerating a froth, such as a froth obtained during froth flotation.

BACKGROUND ART

Froth flotation is widely used in the mineral processing and coal processing industries. Froth flotation typically involves forming fine air bubbles in a slurry. A collector is also added to the slurry and the collector promotes particles containing valuable minerals or coal adhering to the air bubbles and rising upwardly through the slurry with the air bubbles. A frother is also added to the slurry to help generate fine air bubbles and form a froth layer. The air bubbles overflow the froth flotation vessel and are collected in a launder or other collection region. Froth flotation has been widely used for many decades and is well understood by persons skilled in the art.

Froths are three-phase materials which are comprised of mineral/coal particles, a liquid film and air. The bubbles of air are surrounded by or defined by a liquid film, with particles being present in or on the liquid film. Particles have the ability to stabilise bubbles. The attachment of particles on the surface of bubbles makes the bubbles get "armoured" and creates a steric barrier to coalescence. SEM images of coal froth and coal slurry have shown that particles on coal froth are neatly arranged on an outer layer and they are organised in a tight manner. In comparison, the coal particles in a coal slurry are not ordered and the distance between particles is irregular. The neat arrangement of coal particles in coal froth arises from the strong interactions between the coal particles and the air-water film. The attractive forces attract the particles together and they link to each other one by one in order. The interactions are strong enough to increase the stability of the coal froth. In contrast, the weak interactions between particles in a coal slurry lead to the redistribution of the coal particles in the slurry. The distance between the particles weakens the effects of forces and, as a result, the system is not stable.

In general, the froth stability is mainly related to the particles properties, the water quality and frother and collector type and usage. Particle size and particle hydrophobicity are the two most important properties determining the stability of the froth. In general, naturally hydrophobic minerals are more easy to form overly stable froth, such as coal, molybdenum and oil sands. In basic terms, the overall froth stability is inversely proportional to particle size, with small particles giving a higher packing efficiency and so producing a more homogenous layer at the air-water interface. In coal preparation plants in Australia, it is common to have more than 50% of particles below 38 μm in the flotation feed, which contributes to the presence of stable coal froth. In base metal and precious metal, ultrafine grinding is becoming increasingly common due to the need to process more and more low grade and complex ores, therefore, many plants need to float mineral particles below 10 μm, which leads to the formation of tenacious froth. In addition to the coal properties, the use of high salinity water in coal preparation plants also increases the stability of the coal froths. In the flotation of iron ores, phosphates and other non-sulphide ores, the collectors (for example amine, sulphonate and fatty acid collectors) used have strong frothing properties and also generate overly stable froth.

The problem of tenacious froth is a challenge for processing plants of many commodities, such as coal, talc, molybdenum, bitumen, potash, zinc, copper, gold, iron oxide and phosphate. The tenacious froths cause severe problems in the downstream dewatering operations. Two types of dewatering circuits are commonly used in mineral processing and coal preparation plants. In the first type of dewatering circuit, the product stream from the froth flotation is sent to a thickener prior to filtration. In these plants, the stable froth accumulates on top of the thickener, which reduces the thickener efficiency, leads to the loss of valuable minerals/coal and discourages the reuse of process water. In the second type of dewatering circuit, filtration is directly used to separate the valuable minerals or coal from water in the froth. However, the stable froth remains on top of the filtration unit, which reduces the permeability of water through the filter cake and also causes a loss of vacuum when vacuum filters are used. All this leads to reduce filtration efficiency.

Other difficulties with tenacious froths arise when froth concentrates flow to sumps where they are pumped to downstream processes. The operation of the pumps is typically based on the level of pulp pre-set. Overly stable froths can foul the level sensors in the sumps and make it difficult to accurately control the level in the sump. There have been instances where stable froths have resulted in failed level control, which caused the sump to overflow and the whole plant to be flooded. In addition, the presence of froth can significantly reduce the pumping efficiency and even damage pumps due to cavitation. This can result in the plant having to be shut down.

To eliminate the negative effects of stable froths on subsequent dewatering, the froth needs to be deaerated before entering the dewatering circuit. Examples of deaeration technology that have been attempted in the past include chemical deaeration and physical deaeration. In terms of chemical deaeration, there have been many chemicals developed for the deaeration of two-phase foams. Commonly used products include oil defoamers, solid defoamers, oil-solid mixture defoamers and polymers. However, the application of deaeration chemicals in three-phase froths is limited.

The accumulation of froths in thickening is a significant challenge for many plants and it tends to be especially problematic when all the ultra-fine mineral/coal is sent to the flotation without desliming. This issue not only results in the loss of valuable mineral/coal into clarified water and contamination of clarified water, but also significantly reduces the thickening efficiency. To reduce the frothing issue, newly designed thickeners utilise reverse weirs and taller centre wells to limit the amount of froths that can enter the process water supply. It is also common now to employ a floating boom that is placed directly in the thickener and use it in conjunction with water sprays. The boom floats on the water interface and drags any froth around the walkway that extends over the thickener, where froths may be reduced by water sprays. Although these designs can ease the frothing issue in thickeners to some extent, they are not effective when highly stable mineral/coal froths exist. In many coal preparation plants, the floating booms are not able to effectively drag the thick viscous froths and the water sprays are not powerful enough to break those froths. Many plant operators tend to reduce the frother/collector dosage to reduce the froth stability. However, this may significantly deteriorate the flotation performance.

With regard to plants that use filtration in the dewatering process, the presence of air bubbles in the filter cake has been found to affect the extent of filtration. It was observed that filter cakes with the presence of air bubbles had a lower water filtration rate and a longer cake formation time. This is due to the blockage of pores and passages through which water was drained, reducing the permeability of the water phase in the filter cake.

It will be clearly understood that, if a prior art publication is referred to herein, this reference does not constitute an admission that the publication forms part of the common general knowledge in the art in Australia or in any other country.

SUMMARY OF INVENTION

The present invention is directed to an apparatus and a method for deaerating froths, especially three-phase froths, such as coal froths, which at least partially overcome at least one of the abovementioned disadvantages or provide the consumer with a useful or commercial choice.

With the foregoing in view, the present invention in one form, resides broadly in an apparatus for deaerating a froth in which the froth is subjected to an impact force and/or a reduction in pressure in order to break bubbles in the froth.

In one embodiment, the present invention provides an apparatus for deaerating a froth comprising a spinning plate positioned to be contacted by the froth whereby the froth contacts the spinning plate and bubbles in the froth are broken by the spinning plate.

In one embodiment, the apparatus further comprises a pipe or vessel or a solid wall surrounding the spinning plate such that froth that has been spun off the spinning plate contacts the pipe or vessel or solid wall. This contact with the pipe or vessel or solid wall causes further breakage of bubbles and therefore increased deaeration of the froth.

In one embodiment, the spinning plate spins at 200 rpm or more, or from 200 rpm to 1500 rpm, or from 200 rpm to 1200 rpm.

In one embodiment, the spinning plate comprises a solid plate. The spinning plate may comprise a circular plate and this is preferred as circular plates or discs are easier to balance when spinning. However, the present invention also extends to spinning plates of other shapes, such as polygonal shaped plates having anywhere from 3 to 12 or more sides. The spinning plates may have a generally flat surface that contacts the froth fed to the plate. Alternatively, the surface of the plate that contacts the froth fed to the plate may slope downwardly or be upwardly convex, or it may slope upwardly or be upwardly concave.

In one embodiment, the spinning plate may have one or more members extending therefrom. In one embodiment, the one or more members extend upwardly from the spinning plate. In another embodiment, the one or members extend downwardly from the spinning plate. The one or more members may extend from the edge or edges of the plate. In these embodiments, the one or more members also contact the froth that has been spun off the spinning plate to assist in breakage of bubbles in the froth.

In another embodiment, the spinning plate may comprise part of a basket. In this embodiment, the apparatus comprises a basket comprising a sidewall, at least part of the sidewall comprising a plurality of openings, the basket being adapted to spin, the basket having a froth entrance to enable froth to be delivered to an interior volume of the basket, such that froth in the interior volume of the basket is forced through the plurality of apertures on the sidewall by spinning of the basket, the spinning plate comprising part of the basket. The spinning plate may comprise a floor of the basket.

In one embodiment, the plurality of openings comprise openings having a minimum dimension of up to 3 mm. In one embodiment, the openings have a minimum diameter of from 0.5 mm up to 2.5 mm, or 0.65 mm up to 2 mm, or 0.8 mm up to 2 mm, or 0.81 mm up to 2 mm, or about 1 mm, or about 1.5 mm, or about 2 mm.

In one embodiment, the sidewall of the basket has at least a portion comprising a mesh or a screen, the mesh or the screen suitably having openings sized as set out above. In another embodiment, the sidewall has at least a portion comprising a wedge wire screen, suitably having openings sized as set out above.

In one embodiment, the basket comprises a floor. In one embodiment, the floor comprises a solid floor.

In one embodiment, the sidewall comprises at least one sloping sidewall. The at least one sloping sidewall may comprise a plurality of sloping sidewalls. The at least one sloping sidewall may extend upwardly and inwardly from the floor of the basket. The inwardly sloping orientation of the sidewall in this embodiment assists in avoiding the blocking of the mesh by large particles present in the froth. The large particles cannot pass through the mesh. With the inwardly sloping wall and the opening around the side of the floor, the particles can slide downwards and be discharged.

A gap or a space may be left between some of the side wall or mesh that forms the side wall and the solid plate or the floor in order to allow large particles to escape from the basket.

In one embodiment, the apparatus further comprises a pipe or vessel or a solid wall surrounding the sidewall of the basket such that froth that has been spun out through the sidewall of the basket contacts the pipe or vessel or solid wall.

In one embodiment, the basket spins at 200 rpm or more, or from 200 rpm to 1500 rpm, or from 200 rpm to 1200 rpm.

In one embodiment, the apparatus further comprises a drive means for rotating the spinning plate. The drive means may comprise a motor attached to a shaft, the shaft being connected to or engaged with the spinning plate to thereby cause the spinning plate to rotate. A gear arrangement may be provided between the motor and the shaft. The skilled person would readily understand that a number of different drive arrangements can be used to cause the spinning plate to spin.

In some embodiments, the diameter of the spinning plate or the spinning basket ranges from 200 mm to 2000 mm. In general terms, the processing capacity of the spinning plate or spinning basket increases with diameter and rotational speed.

In some embodiments, one motor can drive more than one spinning plate or more than one spinning basket at the same time. More than one spinning plate or spinning baskets can be vertically mounted on the same shaft.

In some embodiments, the apparatus comprises a plurality of spinning plates vertically spaced from each other. Upper plates of the plurality of spinning plates may have one or more openings therein to allow froth to distribute on the plurality of spinning plates. In one embodiment, the one or more openings on an upper plate has a greater open area than the one or more openings on an adjacent lower plate. In this embodiment, the arrangement of openings in the upper plates allows froth to flow down to the plate immediately below and to distribute the froth relatively evenly. In one embodiment, the upper plates comprise an annular plate having radial spokes connecting the annular plate to a shaft. In another embodiment, the upper plates comprise plates having holes or openings formed therein.

In some embodiments, an impeller can be fitted below the spinning plate or spinning basket to pump out the slurry under pressure. This will allow the spinning plate or spinning basket to be used on top of a thickener or any tank containing froth without the need to feed the froth to the spinning plate or to collect the froth into the spinning basket In a second aspect, the present invention provides a method for deaerating a froth comprising subjecting the froth to a reduction in pressure and/or an impact force to break bubbles in the froth.

In one embodiment, the method comprises contacting the froth with a spinning plate whereby the froth contacts the spinning plate and bubbles in the froth break.

In one embodiment, the spinning plate is surrounded by a vessel or a pipe or a solid wall and the froth that is spun out from the spinning plate contacts the vessel or the pipe or the solid wall. This causes further breakage of the bubbles in the froth.

In one embodiment, the spinning plate spins at 200 rpm or more, or from 200 rpm to 1500 rpm, or from 200 rpm to 1200 rpm.

In one embodiment, the spinning plate may have one or more members extending therefrom. In one embodiment, the one or more members extend upwardly from the spinning plate. In another embodiment, the one or more members extend downwardly from the spinning plate. The one or more members may extend from the edge or edges of the plate. In these embodiments, the one or more members also contact the froth that has been spun off the spinning plate to assist in breakage of bubbles in the froth.

In another embodiment, the spinning plate may comprise part of a basket. In this embodiment, the apparatus comprises a basket comprising a sidewall, at least part of the sidewall comprising a plurality of openings, the basket being adapted to spin, the basket having a froth entrance to enable froth to be delivered to an interior volume of the basket, such that froth in the interior volume of the basket is forced through the plurality of apertures on the sidewall by spinning of the basket, the spinning plate comprising part of the basket. The spinning plate may comprise a floor of the basket.

In one embodiment, the method comprises feeding the froth to an inner the volume of a spinning basket having a sidewall, at least a portion of the sidewall comprising a plurality of openings, whereby the froth is spun out through the plurality of openings to thereby deaerate the froth.

In one embodiment of the method of the second aspect of the present invention, the plurality of openings comprise openings having a minimum dimension of up to 3 mm. In one embodiment, the openings have a minimum diameter of from 0.5 mm up to 2.5 mm, or 0.65 mm up to 2 mm, or 0.8 mm up to 2 mm, or 0.81 mm up to 2 mm, or about 1 mm, or about 1.5 mm, or about 2 mm.

In one embodiment, the basket comprises a floor. In one embodiment, the floor comprises a solid floor.

In one embodiment, the froth comprises a three-phase froth. In one embodiment the froth comprises a coal froth resulting from the flotation of coal.

In one embodiment, the sidewall comprises at least one generally vertical sidewall. In another embodiment the sidewall comprises at least one sloping sidewall. The at least one sloping sidewall may comprise a plurality of sloping sidewalls. The at least one sloping sidewall may extend upwardly and inwardly from the floor of the basket.

In one embodiment of the method of the second aspect of the present invention, the coal froth comprises a coal froth that has been separated from a coal slurry arising from collapse of unstable foam in a coal froth removed from a coal flotation operation, or a coal froth from a thickener that is located downstream of a coal flotation operation or a coal froth from a filter that is located downstream of a coal flotation operation.

In one embodiment, the spinning plate or spinning basket is positioned within a vessel, the vessel having an opening for receiving froth from a layer of froth, wherein froth that enters the vessel through the opening moves into contact with the spinning plate or the spinning basket and is spun out from the spinning plate or spinning basket to thereby deaerate the froth and form a coal slurry or mineral slurry, the vessel having an outlet through which the coal slurry or mineral slurry leaves the vessel. In one embodiment, an impeller with a housing may be fitted below the spinning plate or spinning basket and the impeller rotates together with the spinning basket to pump out the deaerated slurry. In another embodiment, the vessel may be provided with a one-way valve to enable coal slurry to exit the vessel and to prevent coal slurry entering the vessel via the outlet.

The apparatus of the first aspect of the present invention and the method of the second aspect of the present invention include embodiments that provide for physical deaeration of froths, such as coal froths and mineral froths.

In another embodiment of the method of the present invention, the present invention provides a method for deaerating a froth comprising subjecting the froth to a reduction in pressure or a vacuum. In one embodiment, the reduction in pressure is a reduction of at least 20 kPa, or at least 50 kPa, or from 20 kPa to 100 kPa, or the vacuum is at least 20 kPa below atmospheric pressure or ambient pressure, or at least 50 kPa below atmospheric pressure or ambient pressure, or from 20 kPa to 100 kPa below atmospheric pressure or ambient pressure.

In one embodiment, the froth comprises a three-phase froth. In one embodiment, the froth comprises a coal froth. In another embodiment, the froth comprises a mineral froth. The froth may be from a froth flotation process.

In one embodiment, the method of the third aspect of the present invention comprises locating a vessel in a layer of froth on a thickener or a filter, the vessel having an inlet through which froth can enter into the vessel and the vessel being connected to a vacuum tank. Froth is drawn into the vessel when applying vacuum and enters into the vacuum tank. Froth was deaerated when entering into the vacuum tank. In one embodiment, the vacuum tank has an outlet through which froth and/or slurry can leave the vessel. In one embodiment, slurry formed by deaerating the froth is removed from the vacuum tank.

In one embodiment, the inlet is located within the froth layer and above a froth/liquid interface.

In one embodiment, the method of this embodiment of the present invention comprises locating a hood in a layer of froth on a thickener or a filter, the hood being connected to the vacuum vessel. The hood has an open bottom through which froth can enter into the hood, and the froth then enters into the vacuum tank. The froth is deaerated when entering into the vacuum tank.

In one embodiment, the open bottom of the hood is located within the froth layer and above a froth/liquid interface.

In another embodiment of the first aspect of the present invention, the present invention provides an apparatus for deaerating froth from a layer of froth, the apparatus comprising a vessel or a hood, the vessel or hood having an opening positioned within the froth layer or the vessel or hood being in fluid communication with the froth layer, the vessel or hood being connected to a source of vacuum wherein when vacuum is applied to the vessel or hood, froth from the froth layer is drawn into the vessel or hood and the froth is deaerated.

In one embodiment, the vessel or hood has an outlet through which slurry and/or froth can leave the vessel or hood. In one embodiment, the vessel or hood is connected to a vacuum tank and slurry and/or froth from the vessel or hood moves to the vacuum tank. The froth may be deaerated in the vacuum tank. In one embodiment, the vacuum tank has a discharge for discharging slurry therefrom.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

It will be appreciated that the drawings have been provided for the purposes of illustrating preferred embodiments of the present invention. Therefore, it will be understood that the present invention should not be considered to be limited solely to the features as shown in the attached drawings.

Figure 1:
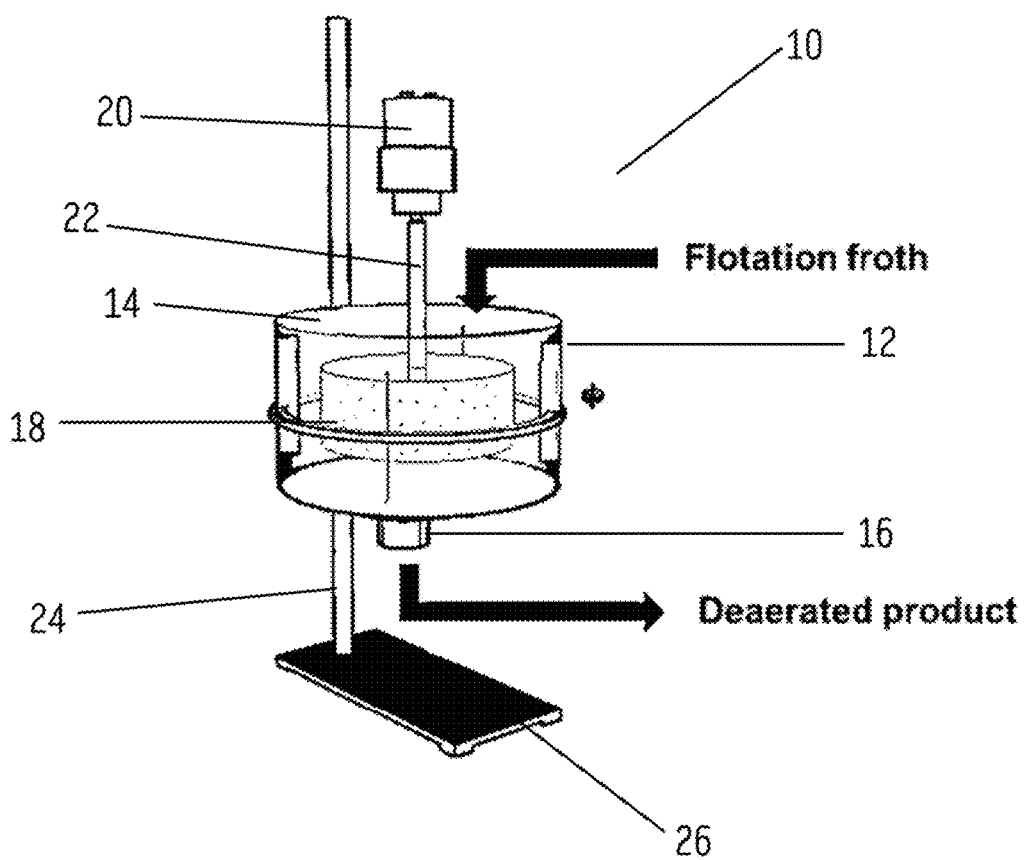
FIG. 1 shows a schematic view of an apparatus for deaerating a froth in accordance with one embodiment of the present invention.

FIG. 1 shows a schematic view of a laboratory scale deaerating apparatus in accordance with one embodiment of the present invention. The apparatus 10 shown in FIG. 1 comprises a vessel 12 having an open top 14 and an outlet 16. A spinning basket 18 is positioned inside the vessel. A drive motor 20 rotates a shaft 22 that is connected to the spinning basket. This causes the basket 18 to rotate. The apparatus 10 is supported on a stand having an upright 24 and a foot 26.

Figure 2:
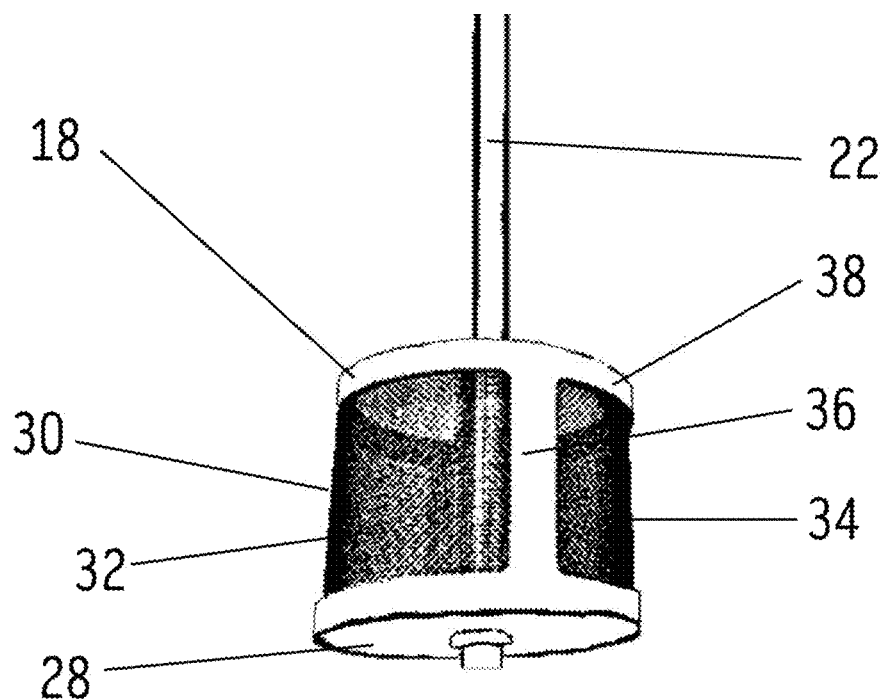
FIG. 2 is a photograph showing a prototype spinning basket for use with the apparatus shown in FIG. 1.

FIG. 2 shows more detail of the basket 18 shown in FIG. 1. The basket 18 has an open top. A froth can be added to the basket through the open top. The basket 18 also has a solid floor 28 and a side wall 30. The side wall 30 comprises regions having a plurality of holes or openings. In the embodiment shown in FIG. 2, these regions comprise regions of mesh, some of which are numbered at 32 and 34. The side wall also includes solid regions, one of which is numbered at 36. A solid cylindrical ring 38 forms the top of the sidewall. The solid regions 36 and the solid cylindrical ring 38 provide strength to the basket.

In use of the apparatus shown in FIGS. 1 and 2, froth is fed to the inner volume of the basket 18 through the open top thereof. As the basket spins, the froth is flung outwardly and passes through the apertures or openings in the mesh regions. This causes the bubbles in the froth to break. The froth also comes into contact with the inner wall of vessel 12 once it has passed through the openings in the sidewalls of the basket 18 and impact with the inner wall of the vessel 12 causes further breakdown of any smaller bubbles that may have passed through the mesh. As a result of the froth being deaerated in this manner, a liquid or a slurry is formed and the liquid or slurry exits vessel 12 through outlet 16. In other embodiments, the side walls and mesh of the spinning basket may be omitted so that only the floor of the basket is used. In this embodiment, the apparatus comprises a spinning plate rather than a spinning basket. As the froth contacts the spinning plate, it is flung outwardly which causes some bubble breakage. The froth is also flung outwardly and impacts with the inner wall of the vessel 12 causes further breakdown of bubbles.

Figure 3:
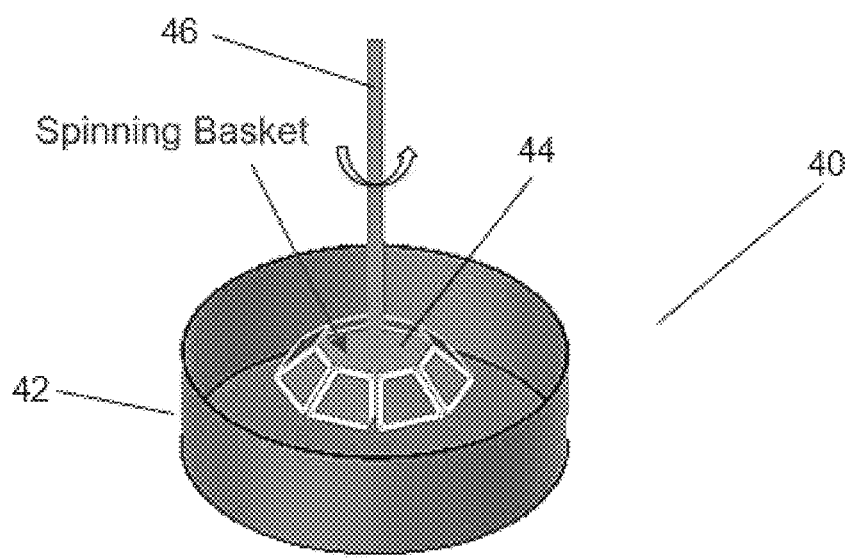
FIG. 3 is a top perspective view of another embodiment of an apparatus for deaerating a froth.
Figure 4:
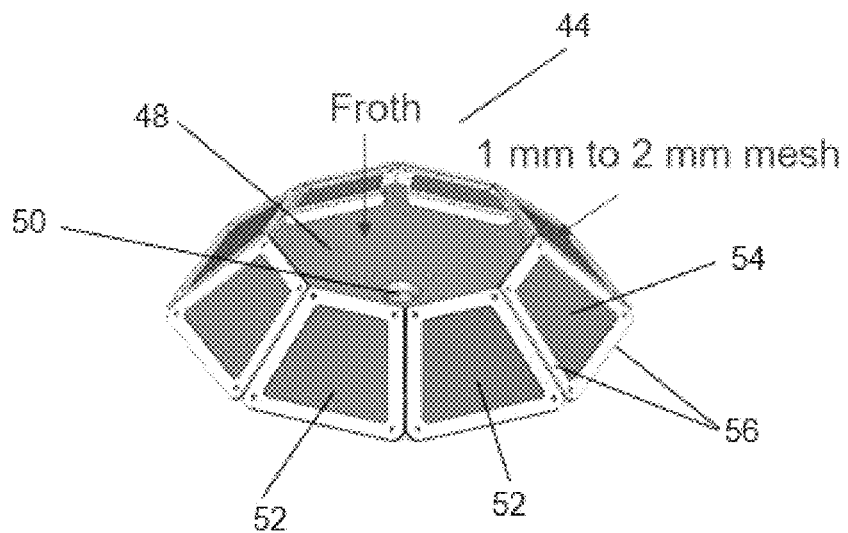
FIG. 4 is a more detailed view of the spinning basket used in FIG. 3.
Figure 5:
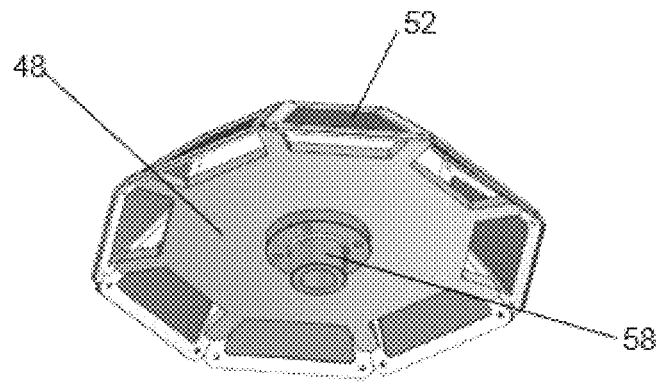
FIG. 5 is an underneath view of the spinning basket shown in FIG. 4.

FIGS. 3 to 5 show various views of another embodiment of a deaerating apparatus that includes a spinning basket. The apparatus 40 shown in FIG. 3 comprises a vessel 42 that surrounds a spinning basket 44. A shaft 46 is connected to the spinning basket 44. The shaft 46 is rotatably driven by a drive motor (not shown).

FIG. 4 shows a close-up view of the spinning basket 44 of FIG. 3. The basket 44 has a solid floor 48 having an opening 50 that enables the shaft 46 to be connected to the floor 48. The sidewall of the basket 44 comprises a plurality of panels 52. Each panel 52 comprises a mesh or screen section 54 that has a solid border 56 to provide strength. The side edges or side borders 56 of each panel 52 are connected to each other to form the sidewall of the basket 44. As can be seen from FIG. 4, each of the panels 56 are sloping inwardly, with the bottom of the panels being located at a greater radial distance from the floor then the top of the panels. In this manner, any froth that may be thrown upwardly near the outer edge of the floor 48 will come into contact with the panels 52.

The mesh or screen section 54 of the panels 52 may comprise a mesh having a mesh opening of between 0.5 mm and 2 mm. The mesh may comprise a woven wire mesh. In another embodiment, the mesh or screen section 54 may comprise a horizontal wedge wire screen or a vertical wedge wire screen.

FIG. 5 shows an underneath perspective view of the spinning basket 44. As can be seen from FIG. 5, a connector 58 is provided to enable the shaft 46 to be connected to the basket. Between the floor 48 and the bottom of panel 52, there is an opening to allow any large particles which cannot pass through the mesh to exit the spinning basket and avoid the blockage of the mesh.

Figure 6:
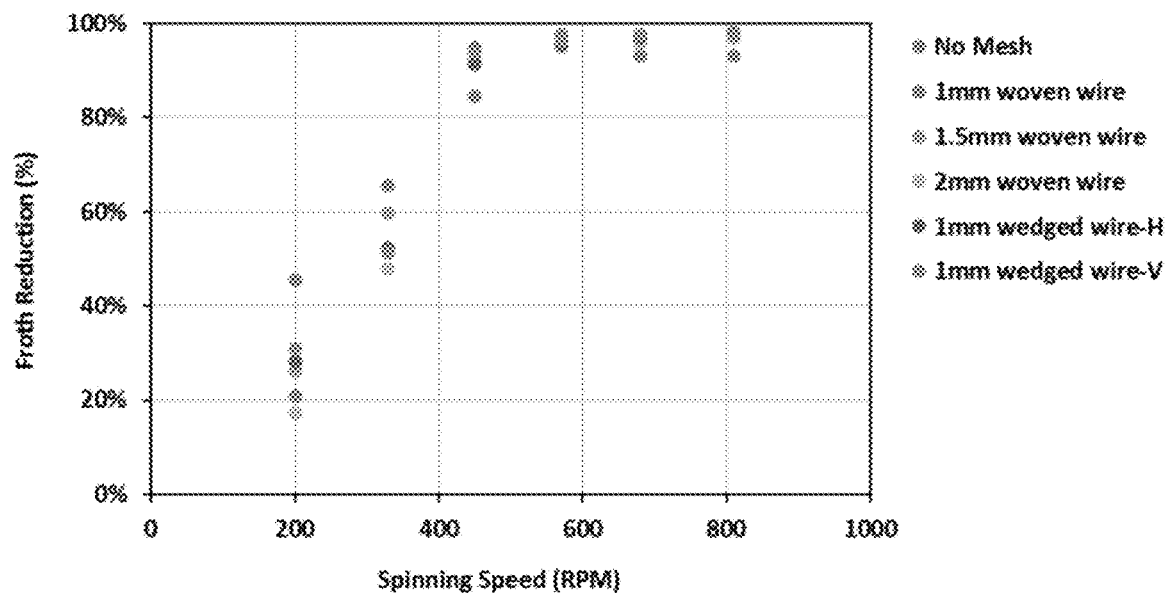
FIG. 6 is a graph of froth reduction vs spinning speed for a number of different aperture sizes and screen types showing the deaeration achieved in the series of test runs conducted by the present inventors using an apparatus similar to that shown in FIGS. 3 to 5.
Figure 7:
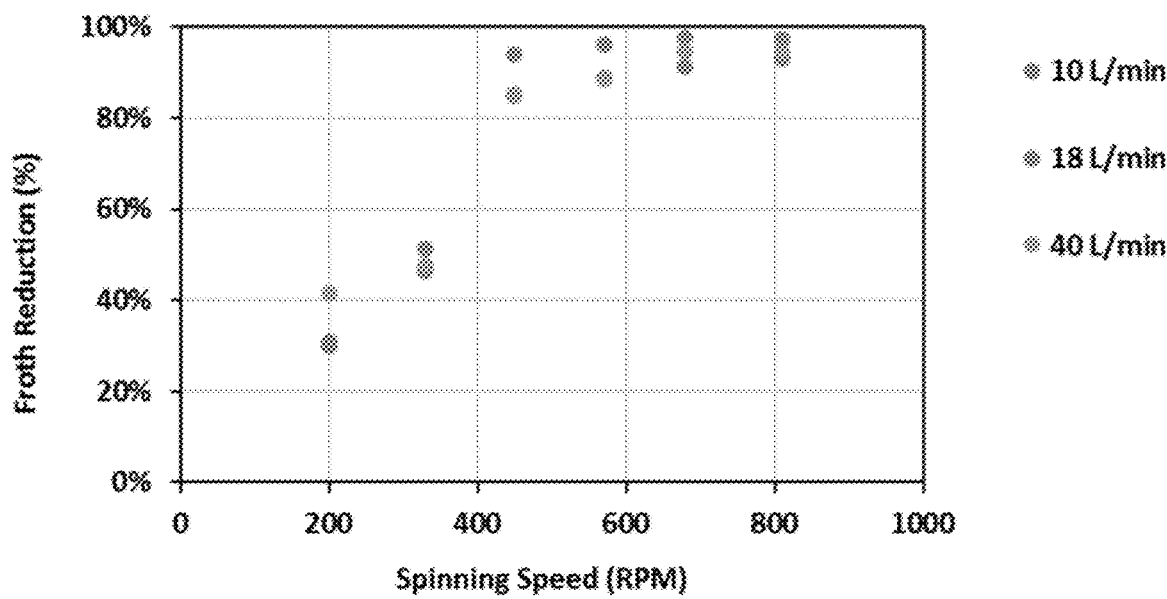
FIG. 7 is a graph of froth reduction vs spinning speed for a number of different feed rates showing the deaeration achieved in the series of test runs conducted by the present inventors using an apparatus similar to that shown in FIGS. 3 to 5.

FIG. 6 shows the results of experiments conducted using an apparatus as shown in FIGS. 3 to 5 to deaerate a coal froth obtained from a coal froth flotation operation. The measure screen section 54 of the panels 52 used for the experimental runs included a 1 mm woven wire mesh, a 1.5 mm woven wire mesh, a 2 mm woven wire mesh, a 1 mm horizontal wedge wire screen and a 1 mm vertical wedge wire screen. As can be seen from FIG. 6, very effective deaeration and froth reduction were achieved at spinning speeds of approximately 430 to 450 rpm for the basket. However, lesser but still noticeable deaeration was achieved at lower spinning speeds. In addition, the deaeration efficiency was only slightly lower when there was no mesh installed. Therefore, the apparatus can also be used in the absence of mesh panel 52 or with the basket being replaced by a spinning plate.

Figure 17:
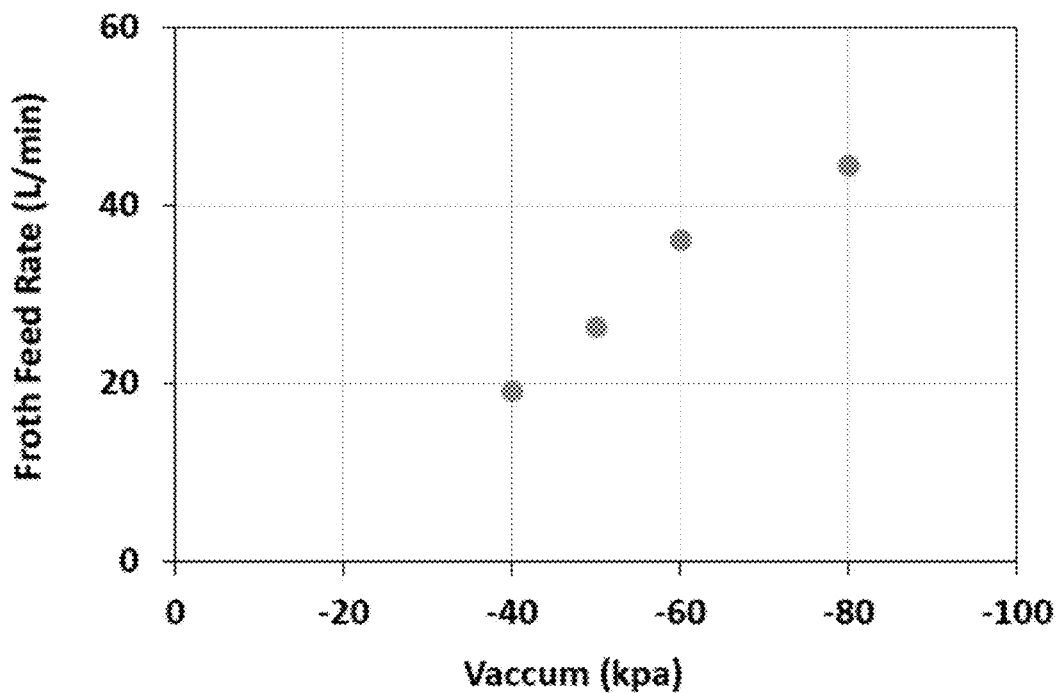
FIG. 17 shows a graph of froth feed rate versus vacuum for a vacuum deaerater in accordance with an embodiment of the present invention.

A further series of tests were conducted using a single spinning basket at different spinning speeds and different feed rates. The froth reduction achieved in these experiments is shown in FIG. 17. Again, highly effective froth reduction for all feed rates was achieved in a spinning speed of above about 430 to 450 rpm for the basket.

Figures 8A, 8B, 8C:
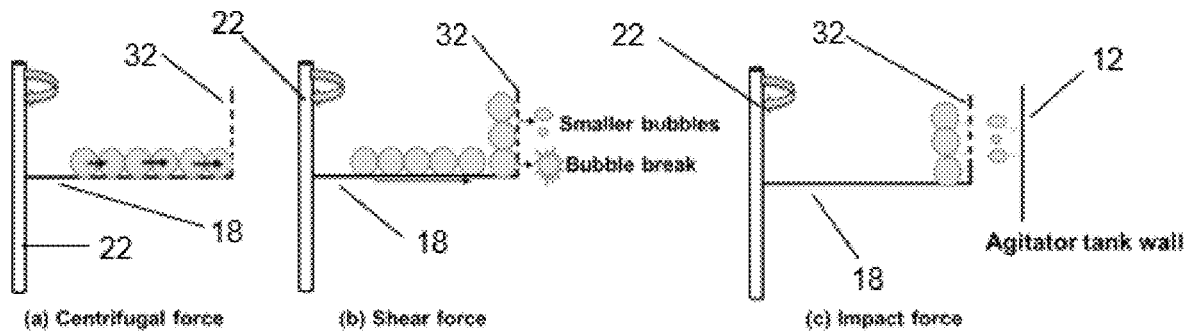
FIGS. 8A to 8C show schematic diagrams explaining likely mechanisms for deaeration being achieved using the apparatus shown in FIGS. 1 to 5.

FIGS. 8A to 8C show some schematic diagrams of possible mechanisms for deaeration of froth using apparatus in accordance with one embodiment of the present invention. As shown in FIG. 8A, when the bubbles of the froth contact the floor 18 of the spinning basket, they are flung outwardly, which applies a centrifugal force to the bubbles. This force acts as an external pressure on the bubbles, causing some of the bubbles to break. As shown in FIG. 8B, as the bubbles move outwardly along the floor 18 and are then forced through the openings of the mesh or screen portions 32, shear forces are applied to the bubbles, which also causes a number of the bubbles to break. As shown in FIG. 8C, smaller bubbles that have passed through the screen or mesh portions 32 or have been formed as larger bubbles passed through the screen or mesh portions 32 are flung into contact with the wall of the vessel 12. This provides an impact force which also assists in breaking down these bubbles. In embodiments where a spinning plate is used instead of a spinning basket, the mechanisms of FIGS. 8A and 8C apply. The centrifugal force created by the spinning plate and the impact force when froth hitting the housing are the most important forces for breaking the froth.

It is likely that slightly lower deaeration will occur when using a spinning plate rather than a spinning basket, although testing has shown that the deaeration efficiency only decreases by around 5%. However, significantly lower maintenance requirements are likely for a spinning plate when compared to a spinning basket.

Figure 9:
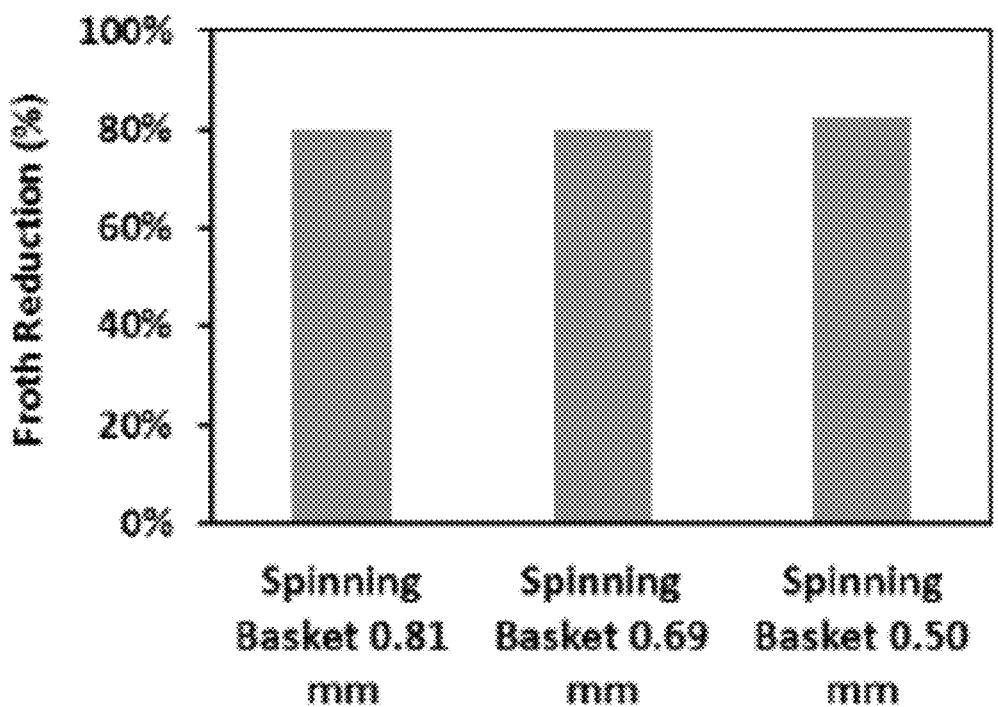
FIG. 9 shows the deaeration achieved in the series of test runs conducted by the present inventors using an apparatus similar to that shown in FIGS. 1 and 2 using different screen sizes or mesh sizes.

FIG. 9 shows a graph of froth reduction against aperture opening of the spinning basket, for spinning baskets having aperture openings of 0.81 mm, 0.61 mm and 0.50 mm, the baskets being spun at 1100 rpm during the experiments. The baskets used in these experiments were as shown in FIG. 2. As can be seen from FIG. 9, effective froth reduction was obtained in each spinning basket. However, it may be desirable to use aperture openings that are in a larger range of the sizes in order to avoid blocking or blinding of the apertures by any large coal particles that may be present in the froth.

Figure 10:
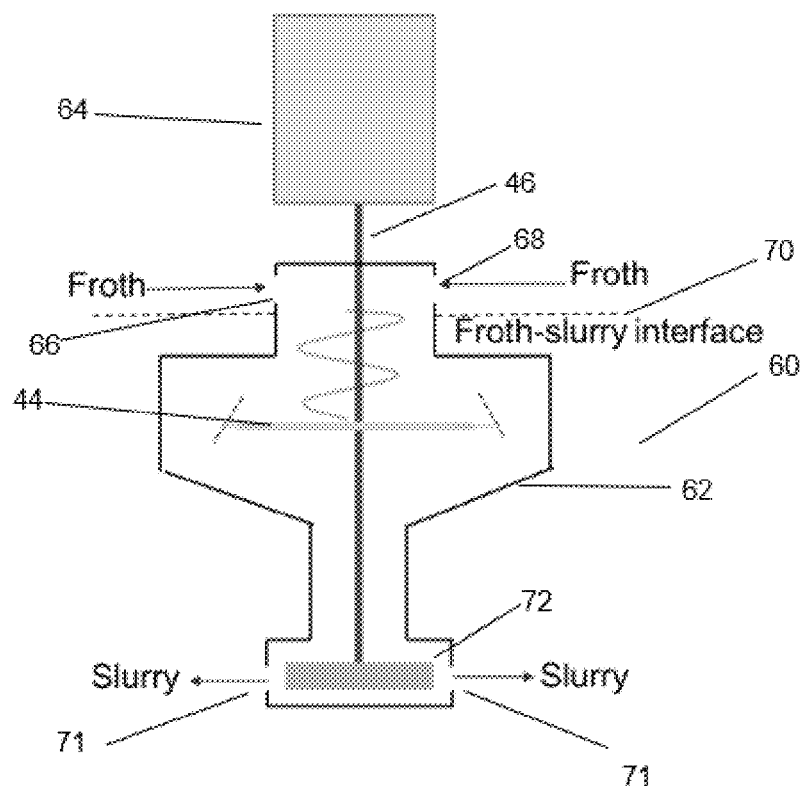
FIG. 10 shows a schematic view of a possible commercial implementation of a deaeration apparatus in accordance with an embodiment of the present invention.

FIG. 10 shows a cross sectional view of an apparatus for deaerating a froth that is present on the top of a thickener or a tank containing flotation products. It will be appreciated that, as explained above, thickeners or tanks used to recover coal from coal flotation operations often have a layer of froth formed on them. The apparatus shown in FIG. 10 can be used to deaerate froth from that layer of froth. The apparatus 60 shown in FIG. 10 comprises a vessel 62. A spinning basket 44, which is identical to the spinning basket 44 shown in FIGS. 3 to 5, is located inside vessel 62. A drive motor 64 rotates the shaft 46 which, in turn, rotates the spinning basket 44. An impeller 72 with a housing is fitted below the spinning basket. The impeller is mounted onto the same shaft which drives the spinning basket and rotates together with the spinning basket. After froth has been deaerated by the spinning basket, the slurry will flow downwards into the impeller and will be pumped out into the thickener or tank.

The vessel 62 has at least two froth inlets 66, 68. The froth inlets 66, 68 are located above the froth-slurry interface 70. Froth inlets 66, 68 are also located within the froth layer. In this manner, froth can enter into the inner volume of the vessel 62 through the froth inlets 66, 68. Due to the positioning of the spinning basket 44 and the shape of the vessel 62, the froth that enters through froth inlets 66, 68 drops into the spinning basket 44.

The vessel 62 also has an outlet 71 through which coal slurry that has been generated by deaeration of the froth can leave the vessel. The outlet 71 may be fitted with an impeller 72 with a housing. The impeller 72 is mounted onto the same shaft which drives the spinning basket and rotates together with the spinning basket. After froth has been deaerated by the spinning basket, the slurry will flow downwards into the impeller and will be pumped out into the thickener or tank.

Figure 11:
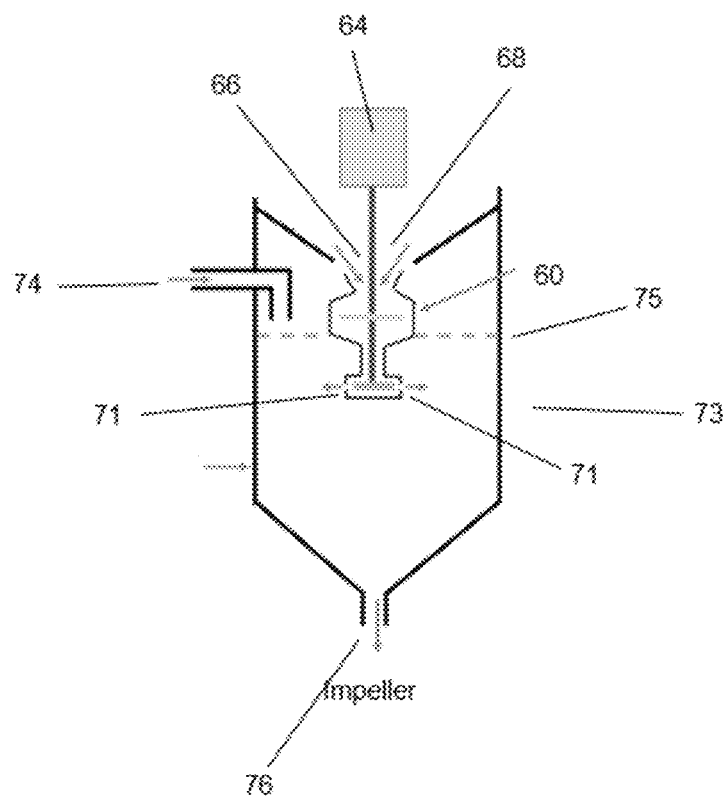
FIG. 11 shows a schematic view of the apparatus shown in FIG. 10 being mounted in a froth-slurry separation tank.

The apparatus 60 shown in FIG. 10 can be directly placed into a froth-slurry separation tank to deaerate froth from flotation product. FIG. 11 shows a completed system that can be used to deaerate a flotation product. Flotation product will be fed to the froth-slurry separation tank 73 via inlet 74. Froth will float on the top by gravity and will be separated from slurry. This results in a froth-slurry interface 75 being established in the tank 73. The separated froth will flow into the physical deaerator 60 via froth inlets 66, 68 and the deaerated slurry will be pumped out through slurry outlets 71 into the slurry phase in the tank 73. The embodiment shown in FIG. 11 allows any un-deaerated froth to float back to the surface and enter the deaerator 60 again. Only slurry will be discharged through slurry outlet 76 at the bottom of the tank. This will achieve a 100% froth reduction.

Figure 12:
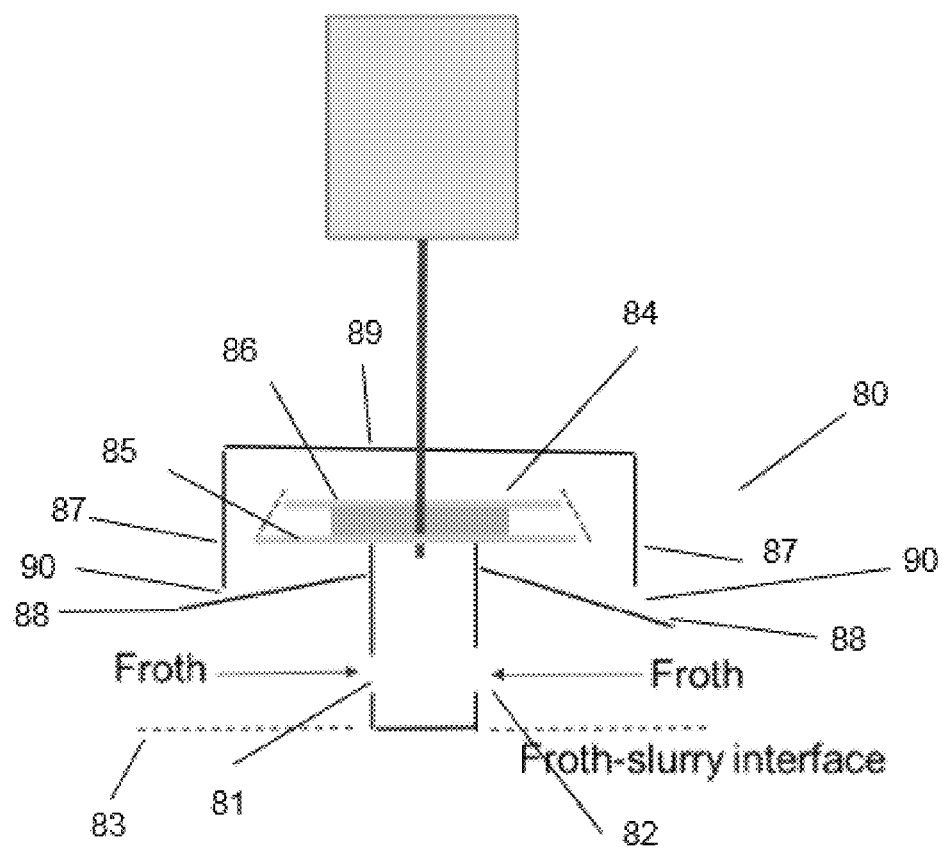
FIG. 12 shows a schematic view of an alternative possible commercial implementation of a deaeration apparatus in accordance with an embodiment of the present invention.

FIG. 12 shows a schematic diagram of another possible embodiment of the present invention. Again, the embodiment shown in FIG. 12 has a vessel 80 that can be at least partly located within the froth layer on a thickener or a tank. The vessel 80 has froth inlets 81, 82 that are located in the froth layer and above the froth slurry interface 83. A spinning basket 84 having sidewalls that are essentially the same as the sidewalls of the basket shown in FIGS. 3 to 5 is positioned inside the vessel 80. The basket 84 has a floor 85 with openings through which the froth can pass. The basket 84 has a solid roof 86. Between the floor 85 and roof 86, there is an impeller which can generate a suction force when rotating to suck the froth into the spinning basket. Roof 86 is solid which ensures that froth entering the basket 84 must pass out through the mesh or screen portions of the sidewalls of the basket. This deaerates the froth that enters the basket. The vessel 80 includes a basket chamber comprising upper sidewalls 87, a sloping floor 88 and a roof 89. A plurality of openings 90 are located above the sloping floor 88 of the basket chamber. In use, froth from the froth layer enters through the froth openings 81, 82 and rises up into the froth basket 84. The froth is then spun out through the mesh or screen portions of the sidewalls of the froth basket 84, to deaerate the froth and form a slurry. The slurry drops down onto the sloping floors 88 and runs down the sloping floors 88 and through the openings 90. The slurry then drops back onto the froth layer and falls through the froth layer into the slurry.

Figure 13:
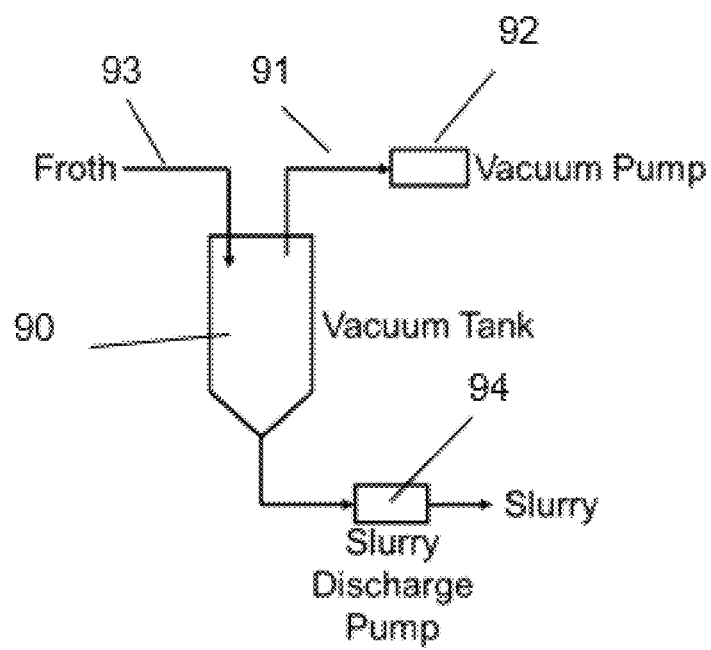
FIG. 13 shows a schematic flowsheet of one arrangement for vacuum deaeration of a froth
Figure 14:
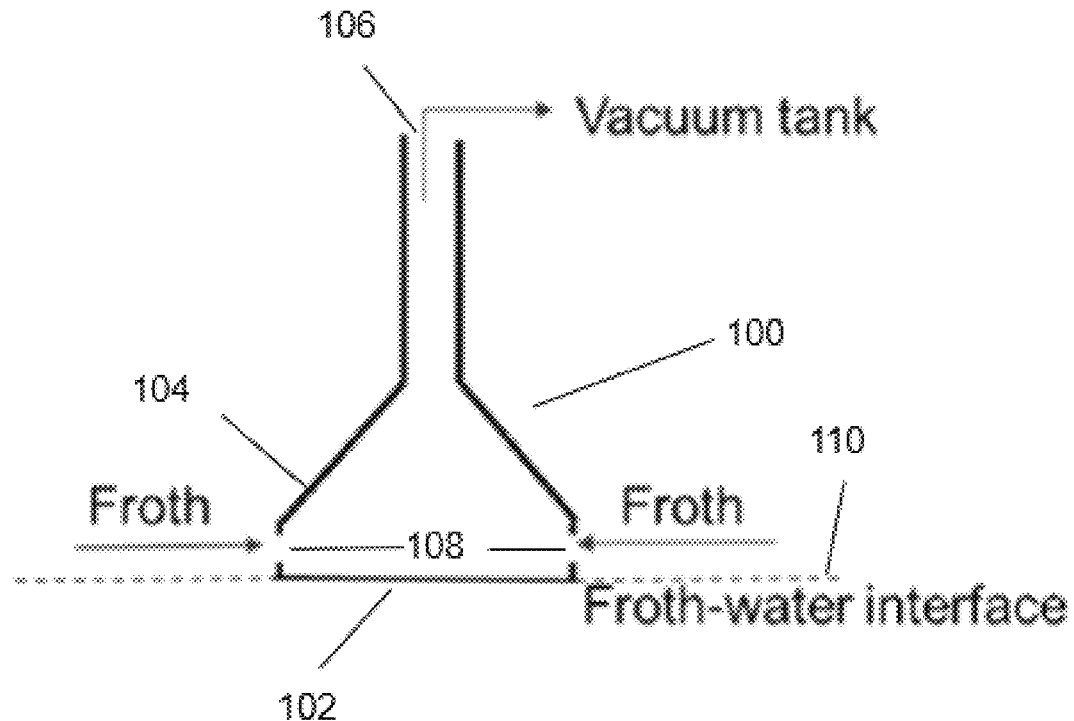
FIG. 14 shows a schematic view of one embodiment of a vacuum deaeration apparatus.
Figure 15:
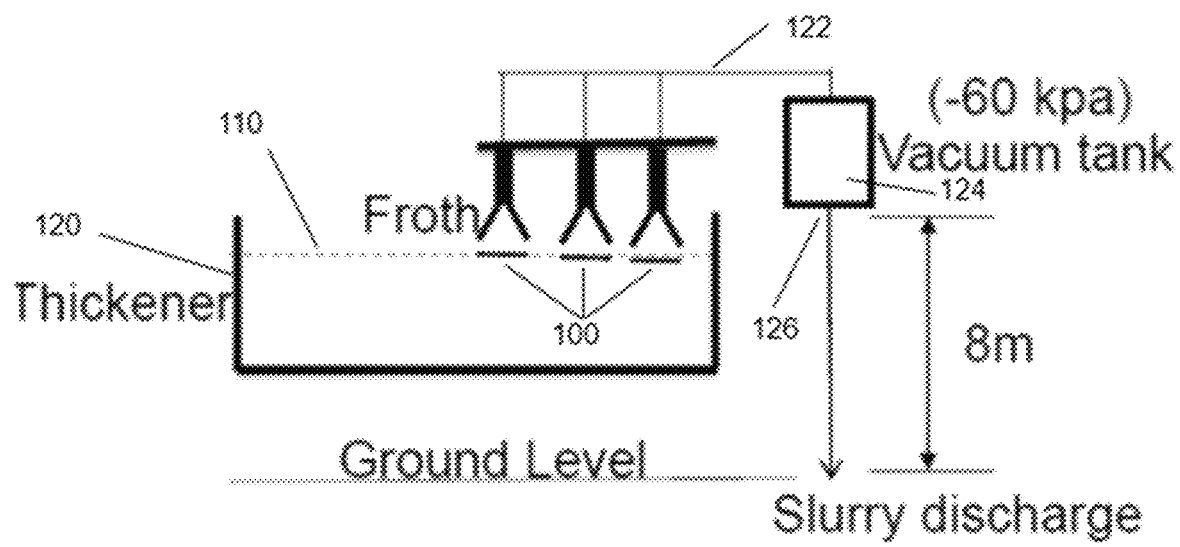
FIG. 15 shows a schematic view of an embodiment of vacuum deaeration apparatus.

FIG. 13 shows a schematic flowsheet of one arrangement for vacuum deaeration of a froth. The flowsheet of FIG. 13 comprises a vacuum tank 90 that is connected via line 91 to a vacuum pump 92. Froth 93 is supplied to the vacuum tank, for example, using apparatus as shown in FIG. 14 or FIG. 15. The vacuum pump 92 is used to maintain a certain level of vacuum inside the vacuum tank 90, such as 20 kPa to 100 kPa below atmospheric pressure. Froth 93 is drawn into the vacuum tank 90 by vacuum and is deaerated when entering into the vacuum tank 90. The slurry that is formed from deaeration of the froth is discharged by a pump 94 at the bottom of the vacuum tank 90 or near the outlet of the vacuum tank 90.

FIG. 14 shows a schematic cross-sectional diagram of an apparatus for deaerating a froth in a froth layer on a thickener or a tank. The apparatus shown in FIG. 14 uses vacuum to deaerate the froth. The apparatus shown in FIG. 14 comprises a vessel 100 having a floor 102, sidewalls, one of which is numbered at 104, and an opening 106 that can be connected to a vacuum tank. The side walls 104 of the vessel 100 include a plurality of froth openings 108, which provide inlets through which froth can enter the vessel 100. As shown in FIG. 14, the inlets 108 are located above the froth-water interface 110 and within the froth layer.

In operation of the apparatus shown in FIG. 14, vacuum is applied to outlet 106. This draws froth into the internal volume of the vessel 100 and then into the vacuum tank that is attached to outlet 106. Due to the lower pressure caused by the vacuum, the internal pressure inside the bubbles causes the bubbles to break, to thereby deaerate the froth.

FIG. 15 shows use of the apparatus shown in FIG. 14 in association with a thickener 120. The thickener 120 has a layer of froth thereon, with the froth/slurry interface being shown at 110. A plurality of vessels 100 which are as shown in FIG. 14, are arranged such that the froth inlets thereof are located within the froth layer. The outlets 106 of the vessels 100 are connected via a vacuum line 122 to a vacuum tank 124. The vacuum tank 124 may be operated at −60 kPa, or at any other vacuum that enables the bubbles in the froth to break. The vacuum tank 124 has a slurry outlet 126 through which slurry generated by breaking of the froth can exit the vacuum tank 124.

Figure 16:
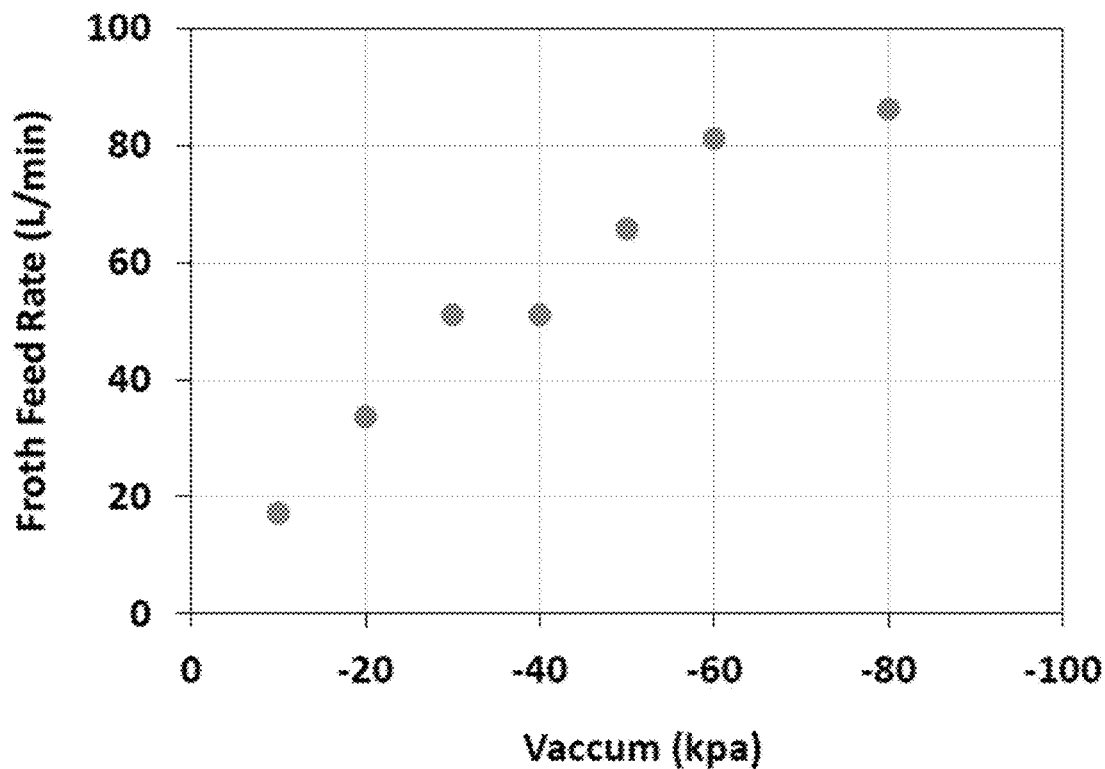
FIG. 16 shows a graph of froth feed rate versus vacuum for a vacuum deaerater in accordance with an embodiment of the present invention.

FIG. 16 shows a graph of froth feed rate vs vacuum pressure for a froth taken directly from a Jameson cell froth flotation operation. FIG. 17 shows a graph of froth feed rate versus vacuum pressure for a froth taken from a froth layer of a thickener. As expected, the feed rate of froth increased as the vacuum was increased. Adequate deaeration was achieved, with superior deaeration occurring at higher vacuums.

Figure 18:
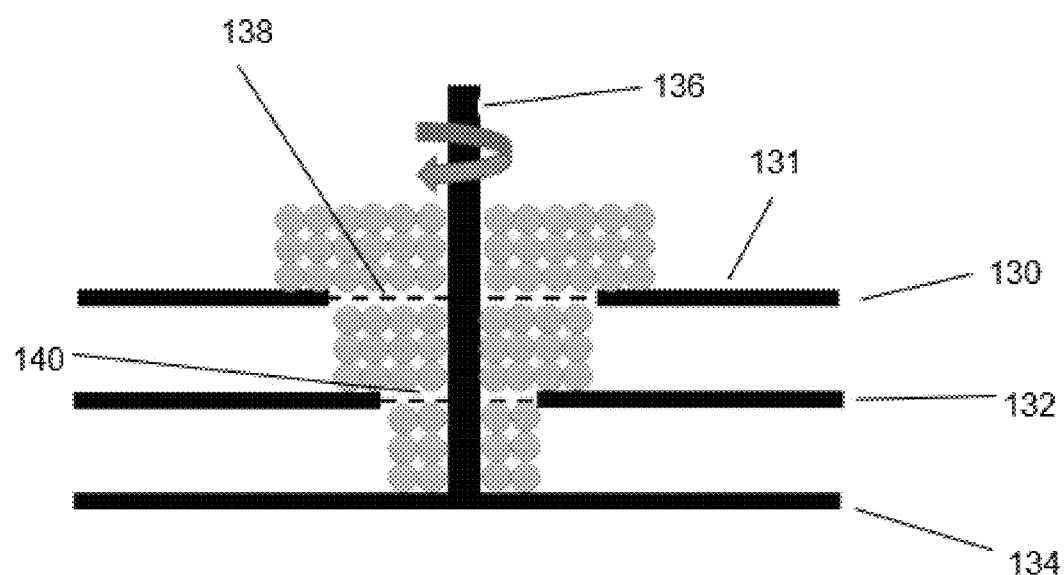
FIG. 18 shows a schematic diagram of an apparatus in accordance with the present invention having a plurality of vertically spaced spinning plates.

FIG. 18 shows an arrangement in which a plurality of spinning plates is used to deareate the froth. In the embodiment shown in FIG. 18, three spinning plates 130, 132, 134 are each mounted to a common shaft 136. The plates 130, 132, 134 are vertically spaced from each other. The upper spinning plate 130 has a relatively large opening(s) 138. Opening(s) 138 may be formed by the plate 130 comprising an annular plate having a solid section 131 and a central opening, with a plurality of spokes connecting the solid part 131 of the annular plate 130 to the shaft 136. Alternatively, a number of holes may be formed in the upper plate 130 to form the opening(s) 138. The immediately lower plate 132, which is the intermediate plate, has an opening(s) 140 therein. The opening(s) 140 be made in the same manner as opening(s) 138. However, the open area of opening(s) 140 is less than the open area of opening(s) 138. This design allows the froth (schematically shown in FIG. 18 as bubbles) to evenly distribute on the multiple spinning plates. It will be appreciated that the centre of the top two spinning plates 130, 132 needs to have holes to allow the froth to flow down to the plate below it and the hole size of the second/lower plate should be smaller than the hole size of the top plate. This arrangement will allow the froth to be distributed on the three plates 130, 132, 134, significantly increasing the processing capacity of the whole unit. It will also be appreciated that the spinning plates may be replaced by spinning baskets, with the upper 2 spinning baskets having holes or openings formed therein to allow the froth to flow to the lower spinning baskets.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus for deaerating a froth in which the froth is subjected to an impact force and/or a reduction in pressure in order to break bubbles in the froth, wherein the apparatus comprises a spinning plate positioned to be contacted by the froth whereby the froth contacts the spinning plate and bubbles in the froth are broken by the spinning plate;
wherein the apparatus comprises a basket comprising a sidewall, at least part of the sidewall comprising a plurality of openings, the basket being adapted to spin, the basket having a froth entrance to enable froth to be delivered to an interior volume of the basket, such that froth in the interior volume of the basket is forced through the plurality of openings on the sidewall by spinning of the basket;
wherein the spinning plate comprises a floor of the basket;
wherein the sidewall comprises at least one sloping sidewall extending upwardly and inwardly from the floor of the basket; and
wherein a gap or a space is present between the side wall and the floor in order to allow large particles to escape from the basket.

2. An apparatus as claimed in claim 1 wherein the plurality of openings comprise openings having a minimum dimension of up to 3 mm, or a minimum diameter, wherein the minimum diameter is from 0.5 mm up to 2.5 mm, or 0.65 mm up to 2 mm, or 0.8 mm up to 2 mm, or 0.81 mm up to 2 mm, or about 1 mm, or about 1.5 mm, or about 2 mm.

3. An apparatus as claimed in claim 1 wherein the sidewall of the basket has at least a portion comprising a mesh or a screen, or the sidewall has at least a portion comprising a wedge wire screen.

4. An apparatus as claimed in claim 1 wherein the apparatus further comprises a pipe or vessel or a solid wall surrounding the sidewall of the basket such that froth that has been spun out through the sidewall of the basket contacts the pipe or vessel or solid wall.

5. An apparatus as claimed in claim 1 further comprising a drive means for rotating the spinning plate.

6. An apparatus as claimed in claim 1 further comprising one or more additional spinning plates vertically spaced from each other.

7. An apparatus as claimed in claim 6 wherein upper plates of the one or more additional spinning plates have one or more openings therein to allow froth to distribute on the one or more additional spinning plates.

8. An apparatus as claimed in claim 7 wherein the one or more openings on an upper plate have a greater open area than the one or more openings on an adjacent lower plate.

9. An apparatus as claimed in claim 1 comprising a vessel or a hood, the vessel or hood having an opening positioned within a froth layer or the vessel or hood being in fluid communication with a froth layer, the vessel or hood being connected to a source of vacuum wherein when vacuum is applied to the vessel or hood, froth from the froth layer is drawn into the vessel or hood and the froth is deaerated.

10. An apparatus as claimed in claim 1, wherein the spinning plate comprises a solid plate.

11. An apparatus as claimed in claim 1, wherein the spinning plate has one or more members extending therefrom.

12. A method for deaerating a froth comprising subjecting the froth to a reduction in pressure and/or an impact force to break bubbles in the froth; said method comprising contacting the froth with a spinning plate whereby the froth contacts the spinning plate and bubbles in the froth break;
wherein a basket comprises a sidewall, at least part of the sidewall comprising a plurality of openings, the basket being adapted to spin, the basket having a froth entrance to enable froth to be delivered to an interior volume of the basket, such that froth in the interior volume of the basket is forced through the plurality of openings on the sidewall by spinning of the basket;
wherein the spinning plate comprises a floor of the basket;
wherein the sidewall comprises at least one sloping sidewall extending upwardly and inwardly from the floor of the basket; and
wherein a gap or a space is present between the side wall and the floor in order to allow large particles to escape from the basket.

13. A method as claimed in claim 12, wherein the froth is a coal or mineral containing froth, wherein the spinning plate is positioned within a vessel, the vessel having an opening for receiving froth from a layer of froth, wherein froth that enters the vessel through the opening moves into contact with the spinning plate and is spun out from the spinning plate to thereby deaerate the froth and form a coal slurry or mineral slurry, the vessel having an outlet through which the coal slurry or mineral slurry leaves the vessel.

14. A method as claimed in claim 13 wherein an impeller with a housing is fitted below the spinning plate and the impeller rotates together with the spinning plate to pump out the deaerated slurry.

15. A method as claimed in claim 14 comprising subjecting the froth to a reduction in pressure or a vacuum, wherein the reduction in pressure is a reduction of at least 20 kPa, or at least 50 kPa, or from 20 kPa to 100 kPa, or the vacuum is at least 20 kPa below atmospheric pressure or ambient pressure, or at least 50 kPa below atmospheric pressure or ambient pressure, or from 20 kPa to 100 kPa below atmospheric pressure or ambient pressure.

16. A method as claimed in claim 15 comprising:
locating the vessel in a layer of froth on a thickener or a tank, the vessel having an inlet through which froth can enter into the vessel and the vessel being connected to a vacuum tank; or
locating a hood in a layer of froth on a thickener or a tank, the hood being connected to a vacuum tank, the hood having an open bottom through which froth can enter into the hood;
whereby froth entering the vessel or the hood moves to the vacuum tank.

17. A method as claimed in claim 12, wherein the spinning plate is surrounded by a vessel or a pipe or a solid wall and the froth that is spun out from the spinning plate contacts the vessel or the pipe or the solid wall.

18. A method as claimed in claim 12, wherein the spinning plate spins at 200 rpm or more, or from 200 rpm to 1500 rpm, or from 200 rpm to 1200 rpm.

* * * * *